United States Patent [19]

Moorman

[11] Patent Number: 4,956,176

[45] Date of Patent: Sep. 11, 1990

[54] SOLIDS-FLUID CONTACTING APPARATUS WITH SCREEN AT FLUID OUTLET

[75] Inventor: Charles T. Moorman, Harrington Park, N.J.

[73] Assignee: Kraft General Foods, Inc., Glenview, Ill.

[21] Appl. No.: 368,714

[22] Filed: Jun. 20, 1989

[51] Int. Cl.$^5$ .......................... A23F 5/00; B01D 11/00
[52] U.S. Cl. ..................................... 426/478; 210/162; 422/261; 426/427; 426/481
[58] Field of Search ............... 426/478, 479, 481, 424, 426/427, 432, 434; 422/261, 267; 210/477, 162, 767

[56] References Cited

U.S. PATENT DOCUMENTS

| | | | |
|---|---|---|---|
| 4,260,639 | 4/1981 | Zosel | 426/478 |
| 4,416,859 | 11/1983 | Brown et al. | 422/261 |
| 4,820,537 | 4/1989 | Katz | 426/481 |

Primary Examiner—George Yeung
Attorney, Agent, or Firm—D. J. Donovan; T. R. Savoie

[57] ABSTRACT

A screen is mounted in an apparatus for contacting particulate solids with a fluid. The apparatus comprises an elongate column for holding a bed of particulate solids for contact with a fluid, the column being designed to be oriented substantially vertically in use and having a fluid inlet near the bottom for admitting a fluid into the column and a fluid outlet near the top for permitting the fluid to exit the column after passing upwardly through a bed of particulate solids in the column. The purpose of the screen is to screen solids from the fluid exiting the column through the fluid outlet. The screen comprises a plurality of vertical screen wires, and the screen is located within the column such that all of the fluid passing through the column passes through the screen and then through the fluid outlet. Each pair of adjacent vertical screen wires defines a substantially vertical screen slot therebetween. The opening of each vertical screen slot at the surface of the screen which is upstream in the sense of a fluid flowing through the column, passing through the screen, and exiting through the outlet during operation of the column, has a width suitable for screening solids from the exiting fluid and has a length which is substantially greater than its width.

16 Claims, 2 Drawing Sheets

SOLIDS-FLUID CONTACTING APPARATUS WITH SCREEN AT FLUID OUTLET

The present invention relates to apparatus for contacting a particulate solid with a fluid in an elongate, substantially vertical treatment vessel, and to a method for continuously treating solid matter with a treatment fluid under high pressure in such a vessel. More particularly, the invention relates to such apparatus, and methods of using such apparatus, which apparatus includes means for periodically moving solids downwardly through the vessel for treatment while a treatment fluid continuously passes through the vessel under high pressure.

BACKGROUND OF THE INVENTION

Solids-fluid contacting equipment is, of course, well known. One of the problems associated with such equipment is the entrainment of solids with the treating fluid and the carrying away of such solids with the treating fluid. Such solids often cause problems, and considerable effort is often taken to deal with them, such as by filtering the solids from the fluid. Filtration is perfectly feasible in some systems. However, in others, filtration is difficult and expensive.

A particular problem has arisen in this respect in the decaffeination of green coffee beans. In a well known commercial process, a batch of green coffee beans is introduced into a vessel, and supercritical carbon dioxide is passed through the vessel to effect decaffeination of the green beans. The supercritical fluid, bearing caffeine and leaving the vessel, is then processed, such as with charcoal, to remove the caffeine. The now caffeine-free supercritical fluid is returned to the vessel. During the entire operation, the Circulating carbon dioxide is maintained under extremely high pressure, keeping the carbon dioxide in a supercritical state. The green coffee beans include a considerable amount of chaff. As the beans are processed, some of the chaff is entrained with the supercritical fluid and passes with the supercritical fluid into the supercritical carbon dioxide loop. The amount of entrained chaff is reduced by flowing the carbon dioxide downwardly through the bed. Chaff which does become entrained becomes separated as the carbon dioxide passes through the charcoal bed. As a preliminary step the raw beans may be subjected to chaff removal. Despite such preliminary chaff removal, however, a considerable amount of chaff enters the system with the beans and a considerable amount of chaff will be entrained in the circulating carbon dioxide. After each batch is completed, chaff is removed with the charcoal in which it has accumulated.

A continuous operation for the decaffeination of green coffee beans utilizing supercritical carbon dioxide has been developed and is disclosed in U.S. Pat. No. 4,820,537 issued to Saul N. Katz, the disclosure of which is incorporated herein by reference. In this process, moistened green coffee beans are moved periodically downwardly, in pulses, through a substantially vertical column, while continuously flowing supercritical carbon dioxide upwardly through the column. Unlike the batch process, the flow of supercritical carbon dioxide in the continuous process is not periodically interrupted, and unlike the batch process, the supercritical fluid circulates in its high pressure loop at substantially constant temperature and pressure. Moreover, the system is not intended to be shut down often, and both shutting down and starting up the system require a considerable amount of time. It will be understood that chaff which enters the system with the moistened beans and which becomes entrained in the supercritical dioxide will continuously build up in the system. This build-up can cause serious problems such as the need to shut down the process. Clearly, steps must be taken to deal with any chaff which flows out of the column with the supercritical fluid.

Filters, of course, could be used. However, it has been found that such filtration is extremely inefficient and expensive to put into practice. It has been found, for example, that a filter becomes highly plugged with chaff in a very short time.

It is an object of the present invention to provide, in a method and apparatus for contacting a particulate solid with a fluid in a treatment vessel, means for removing, in an efficient manner, chaff or other solids which becomes entrained in the treatment fluid as it passes through the treatment vessel.

BRIEF SUMMARY OF THE INVENTION

The foregoing and other objects which will be apparent to those of ordinary skill in the art are achieved in accordance with the present invention by modifying apparatus for contacting a particulate solid with a fluid. The apparatus comprises an elongate column for holding a bed of particulate solids for contact with a fluid. The column is designed to be oriented substantially vertically in use and has a fluid inlet near the bottom thereof for admitting a fluid into the column and a fluid outlet near the top thereof for permitting the fluid to exit from the column after passing upwardly through a bed of particulate solids in the column. In accordance with the invention, this apparatus is provided with a screen for screening solids from the fluid exiting the column through the fluid outlet, the screen comprising a plurality of vertical screen wires. The screen is located within the column adjacent the fluid outlet and is positioned such that all of the fluid passing through the column passes through the screen and thence through the fluid outlet. Each pair of adjacent vertical screen wires defines a substantially vertical screen slot therebetween, the width of each vertical screen slot being such as to screen solids from the exiting fluid and the length of each slot being many times its width, preferably at least ten times its width, and more preferably at least 25 or 50 times its width. Each wire is preferably substantially tapered, in its cross section, inwardly in a direction away from its upstream surface, the term "upstream" being in the sense of the direction of flow of the fluid through the screen. Thus, the slot width is greater at the downstream surface of the screen than at its upstream surface. The screen wires are preferably wedge-shaped in cross section. A method in accordance with the invention comprises continuously treating solid matter with a treatment fluid under high pressure in a substantially vertical column through which a treatment fluid moves continuously upwardly through a bed of solid particulate matter in the column and then exits the column through a fluid outlet at the top of the column. Particulate solids are periodically pulsed downwardly through the column with fresh solids being introduced into the top of the column and with treated solids being discharged from the bottom of the column. The treatment fluid moves continuously through the column, and at high pressure. In accordance with the invention, a screen as described above is positioned in the column to screen solids from the fluid exiting the column. The screen is cleaned by the movement of the particulate high pressure solid matter as it is pulsed downwardly through the column, thus avoiding the need to interrupt the high pressure process in order to clean the screen.

DETAILED DESCRIPTION OF PREFERRED EMBODIMENTS

There follows a detailed description of preferred embodiments of the invention including the drawings in which.

DETAILED DESCRIPTION OF THE INVENTION

Figure 1:
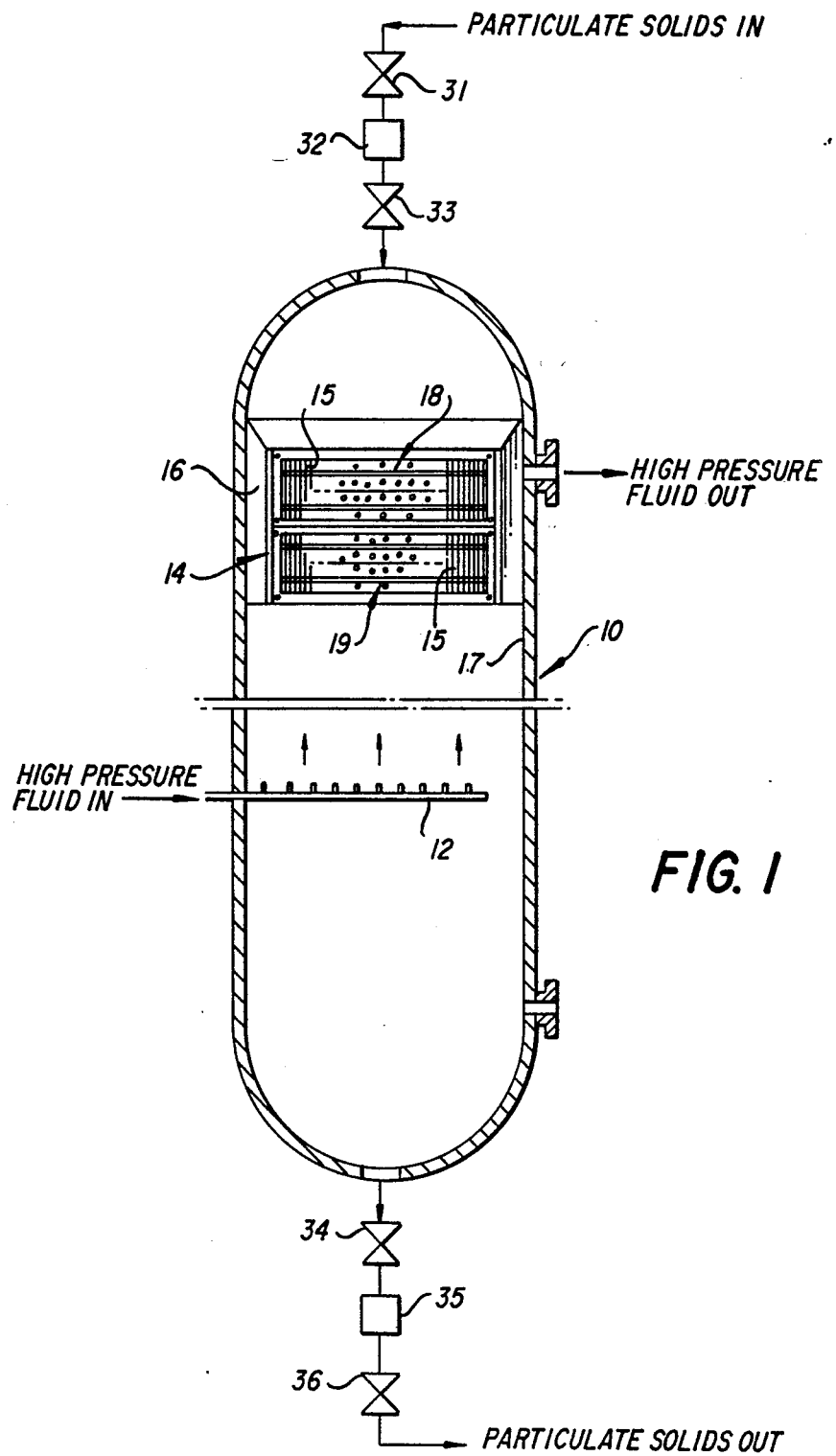
FIG. 1 is a diagrammatic side elevation view of apparatus for contacting a particulate solid with a fluid and including a screen in accordance with the invention within the column adjacent the fluid outlet at the top of the column.

Referring to FIG. 1, apparatus for contacting a particulate solid with a fluid comprises an elongate column or pressure vessel 10. The vessel is suitable for holding a bed of particulate solids, not shown in FIG. 1, for treatment with a fluid flowing through the column. In use, the vessel is designed to be oriented substantially vertically and has a fluid inlet 11 at its lower end for admitting a fluid. A sparger 12, or the like, may be used for this purpose. The vessel also includes a fluid outlet 13 near the top of the column for permitting the fluid to exit the column after passing upwardly through the bed of particulate solids.

In accordance with the invention, a screen 14 is provided within the column, at its upper end, and adjacent to the fluid outlet. The screen is positioned such that all of the fluid which passes upwardly through the column passes through the screen and thence through outlet 13. The screen comprises a plurality of screen wires 15 which are vertical in the sense that they are oriented vertically when the column is positioned vertically for use as shown in FIG. 1. Thus, the screen wires are substantially parallel with the longitudinal axis of the elongate columnar vessel.

The vessel shown in FIG. 1 is cylindrical as is the screen 14 which is positioned concentrically within the cylindrical vessel and spaced inwardly therefrom such that an annular gap 16 or space, which serves as a collection plenum for fluid flowing through outlet 13, is present between screen 14 and inner wall 17 of vessel 10. Screen 14 is positioned in the column such that all of the fluid which passes upwardly through the column from inlet 12 passes through the screen and thereafter through fluid outlet 13. Although only one opening is shown in the fluid outlet, it will be understood that the fluid outlet can include any number of openings.

Figure 3:
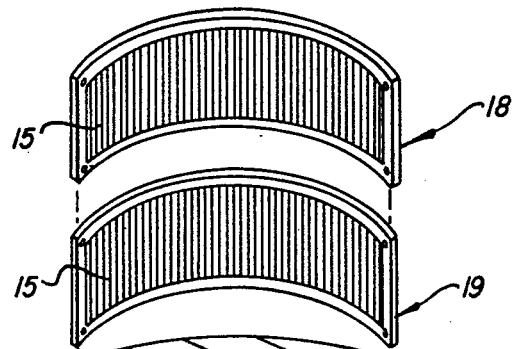
FIG. 3 is a diagrammatic sectional view of a screen element taken along the lines 3—3 of FIG. 2.
Figure 4:
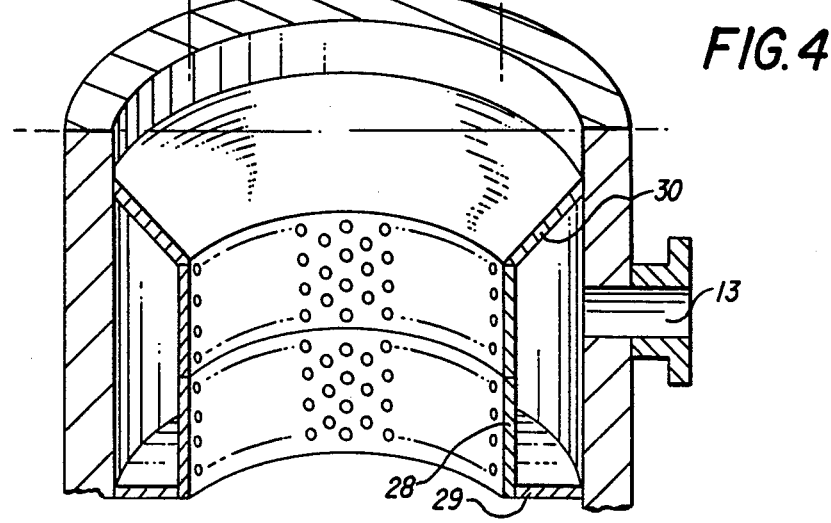
FIG. 4 is an enlarged diagrammatic elevational sectional view of the top portion of the column of FIG. 1 showing details of the manner of mounting a screen in the column.

Screen 14 can be made up of one or more individual screen elements such as screen elements 18 and 19 shown in FIG. 4. Such an arrangement enables a large screen to be mounted in a vessel where access to the vessel is through an opening smaller than the screen. This is particularly advantageous in large vessels designed to operate at high pressure and having a relatively small access opening. FIGS. 1–4 show a screen 14 which is made up of four semi-cylindrical screen elements, two of which, 18, 19, are shown in FIGS. 1 and 3. One of these, screen element 18, is illustrated in more detail in FIGS. 2 and 3. Prior to being mounted in cylindrical column 10, each screen element is shaped into semi-cylindrical form as shown in FIG. 4.

Adjacent vertical screen wires define substantially vertical screen slots. The opening of each vertical screen slot at the upstream surface of the screen has a width which is designed to screen solids from the exiting fluid, and which has a length which is substantially greater than its width at its upstream surface. In general, the length of each slot is at least ten times its width, and preferably at least 25 or 50 times its length. The maximum length of each slot is determined primarily by practical considerations of fabrication of the screen and by a desired total screen opening. In general, a slot length of about 50 to 200 times slot width is suitable. The individual wires are sufficiently massive to maintain slot width substantially uniformly along each slot. Where the slots are relatively long and the individual wires are relatively small in cross section, reinforcing elements may be secured to the wires, such as by welding, in order to maintain the adjacent screen wires substantially parallel to one another. As mentioned above, the terms "upstream" and "downstream" are used in the sense of the direction of the flow of the fluid through the screen. Thus, the "upstream" surface of the screen shown in FIG. 1 is the innermost surface of the screen in the column.

Figure 2:
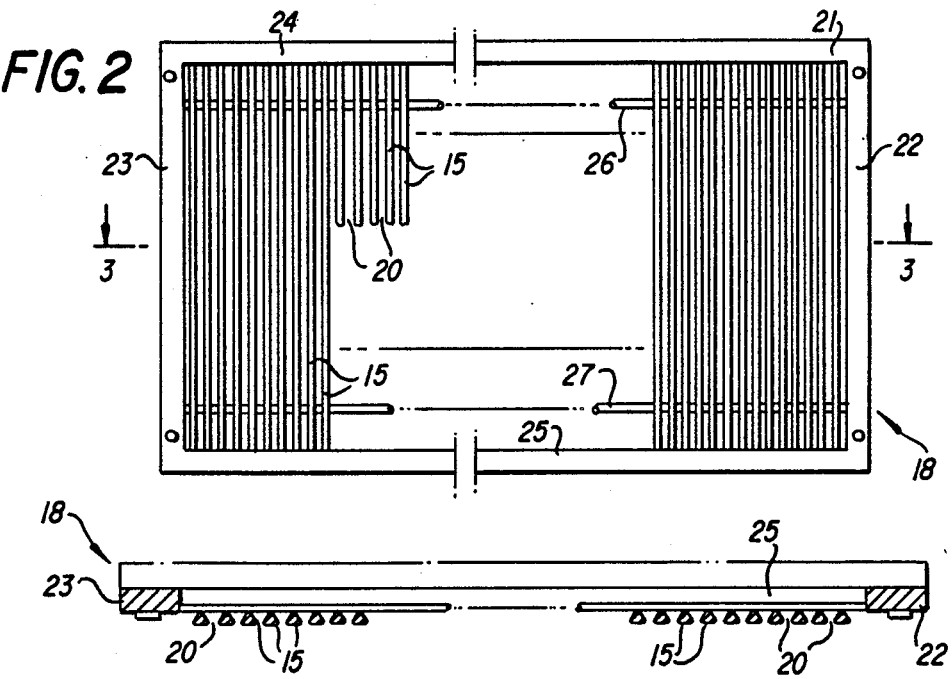
FIG. 2 is an enlarged diagrammatic side elevation view of a screen element which can be employed to make up the screen shown in FIG. 1.

As shown most clearly in FIG. 2, each screen element is conveniently made up of an exterior frame 21, rectangular in configuration, and having vertical frame members 22, 23 and horizontal frame members 24, 25. Backing bars 26, 27 are provided as necessary to maintain proper spacing between screen wires 15.

As shown most clearly in FIG. 4, screen 14 is supported in the column by being mounted on a cylindrical perforated support plate 28 which is itself concentrically mounted within the column by lower and upper support plates 29 and 30. As in the case of screen 14, the screen supporting structure may be assembled in its location in the column, such as by welding. Support members 28, 29, and 30 together support the screen in the upper portion of the column in such a manner that all of the fluid rising through the column passes through the screen and thence through outlet 13. Lower support plate 29 is an annular, imperforate plate located near the bottom of cylindrical perforated support plate 28. Upper support plate 30 is also annular and imperforate and is preferably frusto-conical in cross section as shown to facilitate downward motion of particulate solid matter through the column.

Screens 18 and 19, each of which is semi-circular in configuration in this embodiment, are mounted on perforate support plate 28 by bolts, by welding or by other suitable means. Two additional semi-circular screen elements (not shown) are also mounted on perforated support plate 28, thus completing the mounting of cylindrical screen 14 in the upper portion of the column. The column, of course, is provided with a suitable access opening to permit mounting of the screen and its supporting elements in the column. The various elements making up the screen and support members 28, 29 and 30 can be assembled in place, such as by welding. It is not necessary for the screen member or its support to extend completely around the periphery of the column.

Wires 15 making up the screen are preferably wedge shaped in cross section as shown in FIG. 3. This ensures that the screen opening at the downstream face of the screen is larger than the screen opening at the upstream face of the screen. It is also preferred that the upstream surface of the screen wires and of the screen itself is substantially planar as shown. This facilitates the cleansing action of the solid particulate matter as it flows downwardly across the face of the screen.

As shown in FIG. 4, the screen is mounted adjacent the inner surface of the vertical wall of the vessel such that the downstream surface of the screen is spaced inwardly from the inner surface of the vessel wall.

The invention has particular utility in cylindrical vessels designed for continuous operation at high pressure. In these vessels, the screen is preferably mounted substantially concentrically within the cylindrical vessel such that an annular gap is formed between the screen and the inner cylindrical surface of the vessel.

As mentioned above, the screen may be made up of a plurality of discrete screen members, and this is particularly convenient when the screen is large, and even more so when a large vessel is designed for operating under high pressure. Conveniently, the discrete screen members can be cylindrical, or they may be segments of a cylinder, or both. In the illustrated embodiment, for example, two cylindrical screen elements are utilized, each of which is made up of a semi-circular arcuate segment.

The screen wires 15 should be sufficiently robust to retain the wire spacing under operating conditions. The opening between the screen wires is designed to prevent solids above a particular size from passing through the screen and exiting with the fluid through outlet 13.

As mentioned above, the invention has particular utility in equipment designed to operate continuously under high operating pressure while periodically moving a particulate solid into the top of the column, downwardly through the column, and out through the bottom of the column. A method and apparatus of this type is described in the Katz patent mentioned above and is diagrammatically indicated in FIG. 1 herein. In a typical process at steady state operating conditions, vessel 10 is substantially filled with a bed of moistened green coffee beans. An essentially caffeine-free supercritical fluid, such as supercritical carbon dioxide, is introduced through inlet 11, 12 and flows upwardly through the bed of coffee beans in the column. Caffeine-containing supercritical fluid is withdrawn from the upper end of the extraction vessel through outlet 13. Moistened green coffee beans are periodically admitted through a valve 31 into a blow case 32. Valves 33 and 34 are simultaneously opened so as to charge the moistened green coffee from blow case 32 into the upper end of the extraction vessel 10 and to discharge a portion of substantially decaffeinated green coffee beans from the lower end of the extraction vessel 10 to blow case 35. Valves 33 and 34 are then closed. Valve 36 is then opened to discharge the substantially decaffeinated green coffee from blow case 35. Additional green coffee is admitted through valve 31 into blow case 32, and the procedure is repeated.

As the coffee is being pulsed downwardly through the column in the manner just mentioned, the supercritical fluid continues to flow, at high pressure, through the column. In a typical operation, supercritical carbon dioxide flows through the column at a pressure of about 250 atmospheres. As the beans move downwardly during each pulse, their movement across the surface of the screen cleans the screen, thus removing chaff which has built up on the screen during the period of operation between each excessive downward pulse. Thus, the column can be maintained in continuous operation without the need of mechanical means to scrape the column, or without the need of backflushing the screen such as by directing a fluid flow through the screen from its downstream surface to its upstream surface. It is a distinct advantage of the invention that such complex and inherently troublesome devices can be avoided.

Upper support plate 30, which is frusto-conical in configuration, acts as a funnel, directing downwardly moving particulate solids inwardly towards the surface of screen 14, which accelerates the downward movement of the solid particles as they are pulsed downwardly through the column. It is therefore preferred that the upper surface of plate 32 is smooth and oriented at an angle of not more than about 45°, preferably about 15-40°, with the column wall, The upstream surface of screen 14 is also preferably smooth and straight to facilitate the cleaning of the screen during the downward movement of the particulate solids.

In a preferred embodiment, in which screen 14 is utilized in a column which is about 100 feet in height and about six feet in diameter, screen 14 is cylindrical and has a height of about 2 feet and a diameter of about 5 feet. Thus the screen is spaced inwardly of the column wall a distance equal to about 8% of the column diameter. In general, it is preferred that the screen is spaced inwardly about 3% to about 15% and more preferably about 5% to 10%, based on the column diameter. The screen is made up of two cylindrical sections, each about one foot in height, with each cylindrical section being made up of three arcuate segments of equal length. The screen wires of each screen segment extend the full height of each screen segment. The slot width between wires is suitable for retention of the chaff from green coffee beans and a slot width of about 0.015 to 0.060 inches is appropriate for this purpose. The total open area of each screen segment is about 0.5 to 5 square feet. The total open area of the screen is substantially greater than the cross sectional area of outlet 13, preferably ten to 100 times greater. The height of the screen can vary considerably, but a height which is about ¼ to 2 times the column diameter will suffice. The total open area of the screen is suitably about ¼ to 5 times, preferably ½ to 3 times, the cross sectional area of the column.

The width between adjacent wires preferably increases in the downstream direction, the individual slots between screen wires thus tapering outwardly. Thus, each screen wire, in cross section, preferably tapers inwardly in the direction of flow of the fluid through the screen and may be substantially wedge-shaped in cross section as shown in FIG. 3. Suitable size of such wedge-shaped wire is about 0.030 to 0.150 in width, tapering at an angle of about 3-30°. The advantages of the present screen arrangement, particularly in continuous, high pressure apparatus, will be thus readily apparent.

What is claimed is:
1. In an apparatus for contacting particulate solids with a fluid comprising:

an elongate column for holding a bed of particulate solids for contact with a fluid therein, said column being designed to be oriented substantially vertically in use and having a fluid inlet near the bottom thereof for admitting a fluid into the column and a fluid outlet near the top thereof for permitting the fluid to exit the column after passing upwardly through a bed of particulate solids therein;

the improvement wherein said apparatus further comprises a screen for screening solids from the fluid exiting the column through said fluid outlet, said screen comprising a plurality of vertical screen wires, said screen being located within said column such that all of the fluid passing through the column passes through said screen and thence through said fluid outlet, each pair of adjacent vertical screen wires defining a substantially vertical screen slot therebetween, the opening of each vertical screen slot at the surface of the screen which is upstream in the sense of a fluid flowing through the column, passing through said screen, and exiting through said outlet during operation of the column, having a width suitable for screening solids from the exiting fluid and having a length which is substantially greater than its width.

2. Apparatus according to claim 1 wherein the width of each respective one of said vertical slots at the upstream surface of said screen is narrower than the width of said respective slot at the downstream surface of said screen.

3. Apparatus according to claim 1 wherein said column comprises a substantially cylindrical vertical wall and wherein said screen is mounted adjacent the inner cylindrical surface of said column wall such that the downstream surface of said screen is spaced inwardly from the inner cylindrical surface of the column wall.

4. Apparatus according to claim 3 wherein said screen is substantially cylindrical and is mounted substantially concentrically within said cylindrical column such that an annular gap is formed between said screen and the inner cylindrical surface of said column wall.

5. Apparatus according to claim 1 wherein said screen comprises a plurality of screen members, each of said screen members comprising a plurality of said vertical screen wires and vertical slots.

6. Apparatus according to claim 5 wherein said screen is substantially cylindrical.

7. Apparatus according to claim 5 wherein said screen comprises a plurality of vertically stacked cylindrical screen members.

8. Apparatus according to claim 5 wherein said screen comprises a plurality of screen members in the form of arcuate segments.

9. Apparatus according to claim 7 wherein each of said cylindrical screen members comprises a plurality of arcuate segments.

10. Apparatus according to claim 1 wherein the total open area of said screen is at least twice the cross sectional area of the opening of the fluid outlet.

11. Apparatus according to claim 6 wherein the vertical height of said substantially cylindrical screen is from about one fourth to two times the inside diameter of the column.

12. Apparatus according to claim 1 wherein the total open area of the screen is from one tenth to two times the cross sectional area of the column.

13. Apparatus according to claim 1 further comprising means for passing said fluid through said column at an elevated operating pressure and for periodically moving particulate solids into the top of the column downwardly through the column, and out through the bottom of the column, while continuously passing said fluid through said column under said elevated operating pressure.

14. Apparatus according to claim 4 further comprising means for supporting said screen, said screen supporting means comprising a downwardly inwardly tapering frusto-conical member secured to the inner cylindrical surface of said column, said screen being mounted at the lower end of said frusto-conical member.

15. In a method of continuously treating particulate solids with a treatment fluid under high pressure in a substantially vertical column through which a treatment fluid runs continuously upwardly through a bed of particulate solids in said column and then exits the column through a fluid outlet at the top of the column and through which column particulate solids are pulsed periodically downwardly therethrough, with fresh solids being periodically introduced into the top of the column and treated solids being discharged from the bottom of the column, the treatment fluid in the column being at said high pressure during operation of the column;

the improvement which comprises mounting a screen in said column, said screen comprising a plurality of vertical screen wires, said screen being located within said column adjacent said fluid outlet and positioned such that all of the fluid passing through the column passes through said screen and thence through said fluid outlet, each pair of adjacent vertical screen wires defining a substantially vertical screen slot therebetween, the opening of each vertical screen slot at the surface of the screen which is upstream in the sense of a fluid flowing through the column and exiting through said outlet during operation of the column, having a width which is designed to screen solids from the exiting fluid and having a length which is several times in width at the upstream surface, whereby the screen is periodically cleaned by the periodic movement of said solids from the top of the column downwardly over the surface of the screen.

16. A method according to claim 15 wherein said particulate solids comprise coffee beans.

* * * * *